US010811870B2

(12) United States Patent
Kikuchi et al.

(10) Patent No.: US 10,811,870 B2
(45) Date of Patent: Oct. 20, 2020

(54) ELECTRIC WIRE PROTECTION DEVICE AND CONTROL METHOD FOR ELECTRIC WIRE PROTECTION DEVICE

(71) Applicants: Yazaki Corporation, Tokyo (JP); HONDA MOTOR CO., LTD., Tokyo (JP)

(72) Inventors: Takashi Kikuchi, Shizuoka (JP); Takahiro Miyakawa, Shizuoka (JP); Syunsuke Nagakura, Shizuoka (JP); Keisuke Ueta, Shizuoka (JP); Tomoya Nishino, Saitama (JP); Noboru Ujigawa, Saitama (JP); Seiju Kawamata, Saitama (JP); Masataka Tsukioka, Saitama (JP); Rikuya Ezoe, Saitama (JP)

(73) Assignees: YAZAKI CORPORATION, Minato-ku, Tokyo (JP); HONDA MOTOR CO., LTD., Minato-ku, Tokyo (JP)

( * ) Notice: Subject to any disclaimer, the term of this patent is extended or adjusted under 35 U.S.C. 154(b) by 413 days.

(21) Appl. No.: 15/917,075

(22) Filed: Mar. 9, 2018

(65) Prior Publication Data

US 2018/0262001 A1 Sep. 13, 2018

(30) Foreign Application Priority Data

Mar. 13, 2017 (JP) .................................. 2017-047328

(51) Int. Cl.
*H02H 5/00* (2006.01)
*H02H 7/22* (2006.01)
(Continued)

(52) U.S. Cl.
CPC .............. *H02H 7/228* (2013.01); *G01K 3/005* (2013.01); *G01K 7/42* (2013.01); *G01K 7/427* (2013.01);
(Continued)

(58) Field of Classification Search
None
See application file for complete search history.

(56) References Cited

U.S. PATENT DOCUMENTS 5,418,677 A * 5/1995 Engel .................... G06J 1/00
361/25
9,948,085 B2 * 4/2018 Nagahama ............. H02H 3/085
(Continued)

FOREIGN PATENT DOCUMENTS

CN 102067401 A 5/2011
CN 103260958 A 8/2013
(Continued)

OTHER PUBLICATIONS

Communication dated Mar. 26, 2019, from the China National Intellectual Property Administration in counterpart Application No. 201810202143.9.

*Primary Examiner* — Stephen W Jackson
(74) *Attorney, Agent, or Firm* — Sughrue Mion, PLLC

(57) ABSTRACT

An electric wire protection device includes a voltage adjusting unit that adjusts voltage of a power source side and supplies the resulting voltage to a load, and a controller that includes a calculation unit configured to compute temperature information of an electric wire connecting the power source and the load from a value of an electric current flowing through the voltage adjusting unit, and that is configured to make the voltage adjusting unit into a shutoff state of shutting off the power source and the load on the basis of the temperature information.

3 Claims, 5 Drawing Sheets

(51) Int. Cl.
*G01K 7/42* (2006.01)
*G01K 3/00* (2006.01)
*H02H 6/00* (2006.01)
H01H 83/20 (2006.01)

(52) U.S. Cl.
CPC ........... *H02H 6/00* (2013.01); *G01K 2205/00* (2013.01); *G01K 2217/00* (2013.01); *H01H 2083/201* (2013.01)

(56) References Cited

U.S. PATENT DOCUMENTS

| | | |
|---|---|---|
| 2007/0253132 A1 | 11/2007 | Nakamura et al. |
| 2011/0080681 A1 | 4/2011 | Maruyama et al. |
| 2013/0253722 A1 | 9/2013 | Nakamura et al. |

FOREIGN PATENT DOCUMENTS

| | | |
|---|---|---|
| CN | 104471814 A | 3/2015 |
| JP | 2007-295776 A | 11/2007 |

\* cited by examiner

FIG.5

$$N_{on} \times \Delta t$$

$$Z \times T_{cal}$$

FIG.6

| SW | ESTIMATED TEMPERATURE Tw | SHUTOFF DETERMINATION |
|---|---|---|
| ON | HI | ON |
| ON | LOW | OFF |
| OFF | HI | KEEP VALUE |
| OFF | LOW | KEEP VALUE |

ELECTRIC WIRE PROTECTION DEVICE AND CONTROL METHOD FOR ELECTRIC WIRE PROTECTION DEVICE

CROSS-REFERENCE TO RELATED APPLICATION(S)

The present application claims priority to and incorporates by reference the entire contents of Japanese Patent Application No. 2017-047328 filed in Japan on Mar. 13, 2017.

BACKGROUND OF THE INVENTION

1. Field of the Invention

The present invention relates to an electric wire protection device and a control method for the electric wire protection device.

2. Description of the Related Art

Conventionally, there are techniques of calculating a temperature of an electric wire and shutting off a load circuit. Japanese Patent Application Laid-open No. 2007-295776 discloses a technique of a load circuit protection device that calculates a temperature rise of an electric wire on the basis of heat characteristics (heat resistance, heat capacity) of the electric wire or a contact conductor when an electric current flowing through a load is increased, calculates a temperature rise by an arc when the arc occurs, and calculates a temperature drop of the electric wire on the basis of the heat characteristics of the electric wire when the current flowing through the load is zero or decreased.

There is still a room for improvement in a technique of protecting the electric wire. For example, a calculation frequency of a heat quantity is considered to be increased in order to improve accuracy of temperature estimation of the electric wire. There is however the problem that the operation load is increased when the calculation frequency is increased. It is desired that both of ensuring of the accuracy of the temperature estimation of the electric wire and reduction in the operation load are achieved.

SUMMARY OF THE INVENTION

An object of the present invention is to provide an electric wire protection device and a control method for the electric wire protection device capable of achieving both of ensuring of accuracy of temperature estimation of an electric wire and reduction in the operation load.

An electric wire protection device according to one aspect of the present invention includes a voltage adjusting unit that adjusts voltage of a power source side and supplies the resulting voltage to a load; and a controller that includes a calculation unit configured to compute temperature information of an electric wire connecting a power source and the load from a value of an electric current flowing through the voltage adjusting unit, and that is configured to make the voltage adjusting unit into a shutoff state of shutting off the power source and the load on the basis of the temperature information, wherein the current value is sampled a plurality of number of times in a predetermined calculation cycle, the calculation unit calculates a heat generation amount of the electric wire in the calculation cycle and a correction coefficient from results of the sampling for the number of times, the heat generation amount is calculated from one current value that is determined from the sampling results for the number of times and the calculation cycle, the correction coefficient is a ratio of a period of time during which energization has been detected in the calculation cycle, and the calculation unit calculates the temperature information by multiplying the heat generation amount by the correction coefficient.

A control method for an electric wire protection device according to another aspect of the present invention includes a step of sampling a current value of a voltage adjusting unit that adjusts voltage of a power source side and supplies the resulting voltage to a load; a step of calculating a heat generation amount of an electric wire in a calculation cycle on the basis of one current value that is determined from results of the sampling for a plurality of number of times; a step of calculating a correction coefficient as a ratio of a period of time during which energization has been detected in the calculation cycle; a step of calculating temperature information of the electric wire by multiplying the heat generation amount by the correction coefficient; and a step of determining whether the voltage adjusting unit is made into a shutoff state on the basis of the temperature information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a chart illustrating a relation between a total energization time and a total sampling time in the embodiment;

FIG. 6 is a descriptive view for explaining shutoff determination in the embodiment.

DETAILED DESCRIPTION OF THE PREFERRED EMBODIMENTS

Hereinafter, an electric wire protection device and a control method for the electric wire protection device according to an embodiment of the present invention will be described in detail with reference to the drawings. It should be noted that the embodiment does not limit the invention. Components in the following embodiment include components that those skilled in the art can easily suppose or substantially the same components.

Embodiment

Figure 1:
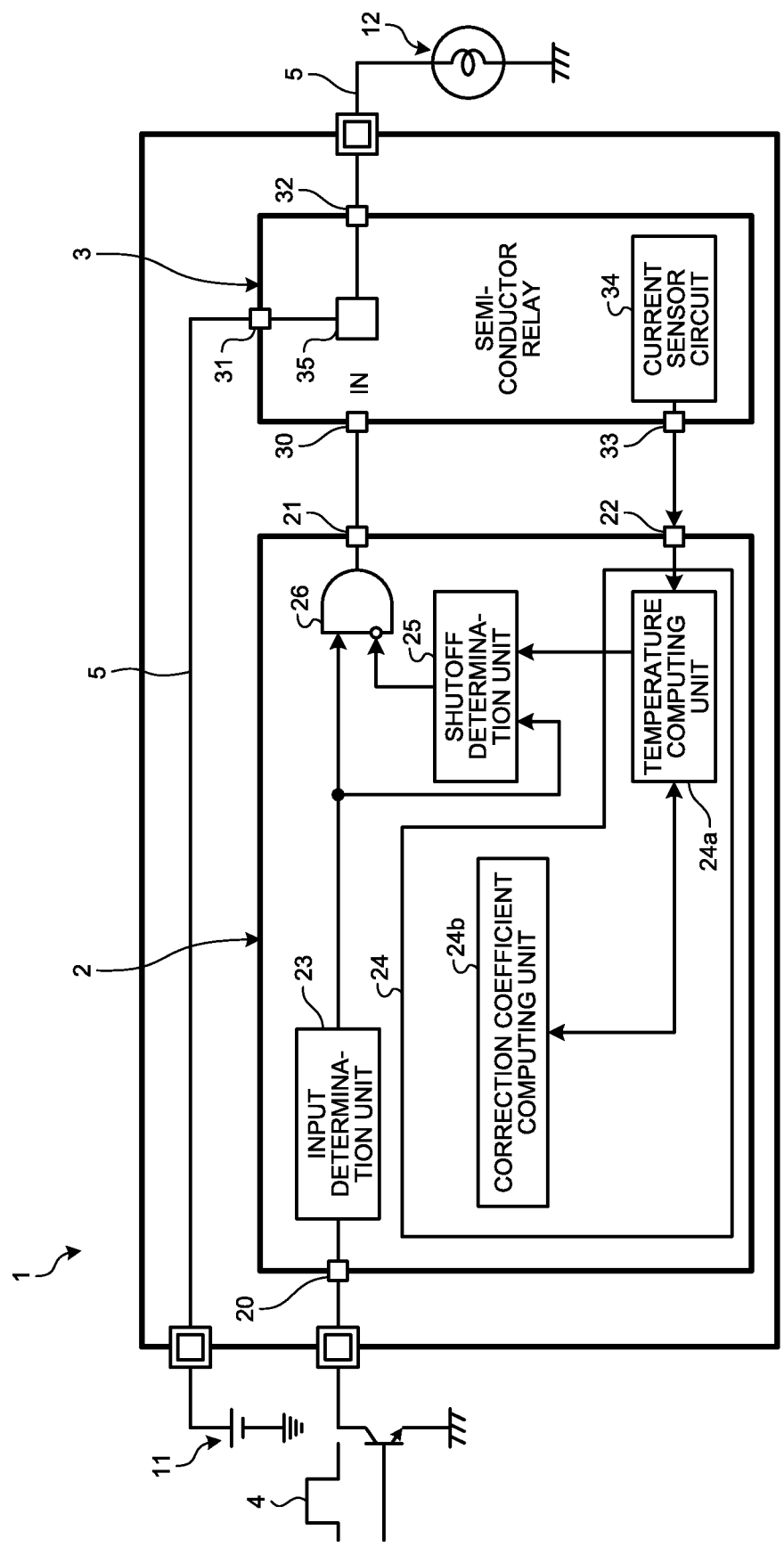
FIG. 1 is a diagram illustrating an electric wire protection device according to an embodiment.
Figure 2:
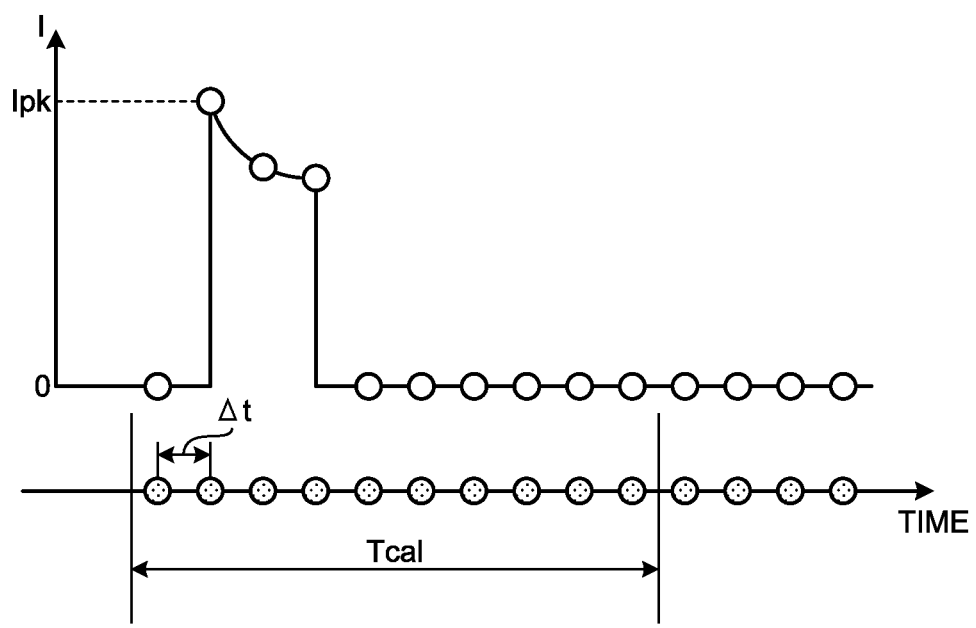
FIG. 2 is a chart illustrating a relation between a sampling cycle and a calculation cycle in the embodiment.
Figure 3:
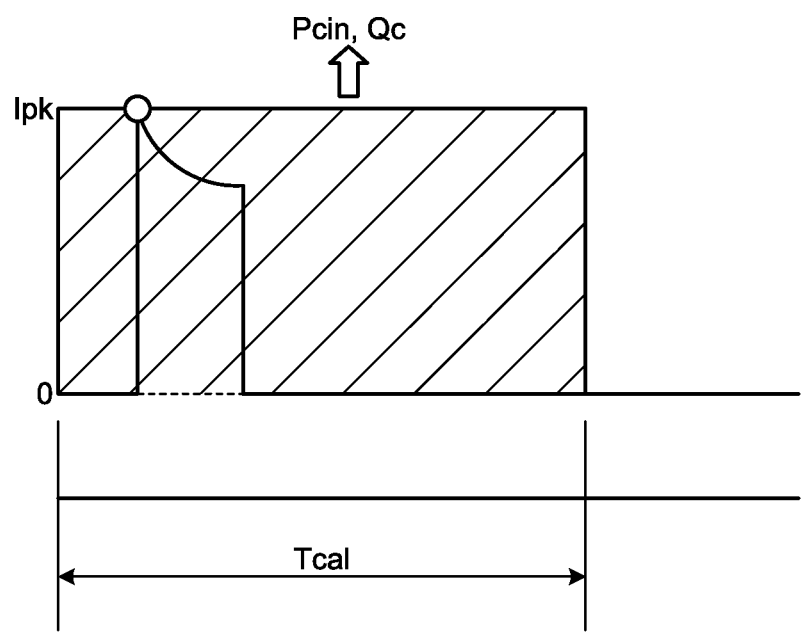
FIG. 3 is a descriptive chart for explaining a method for calculating a heat quantity from a peak current.
Figure 4:
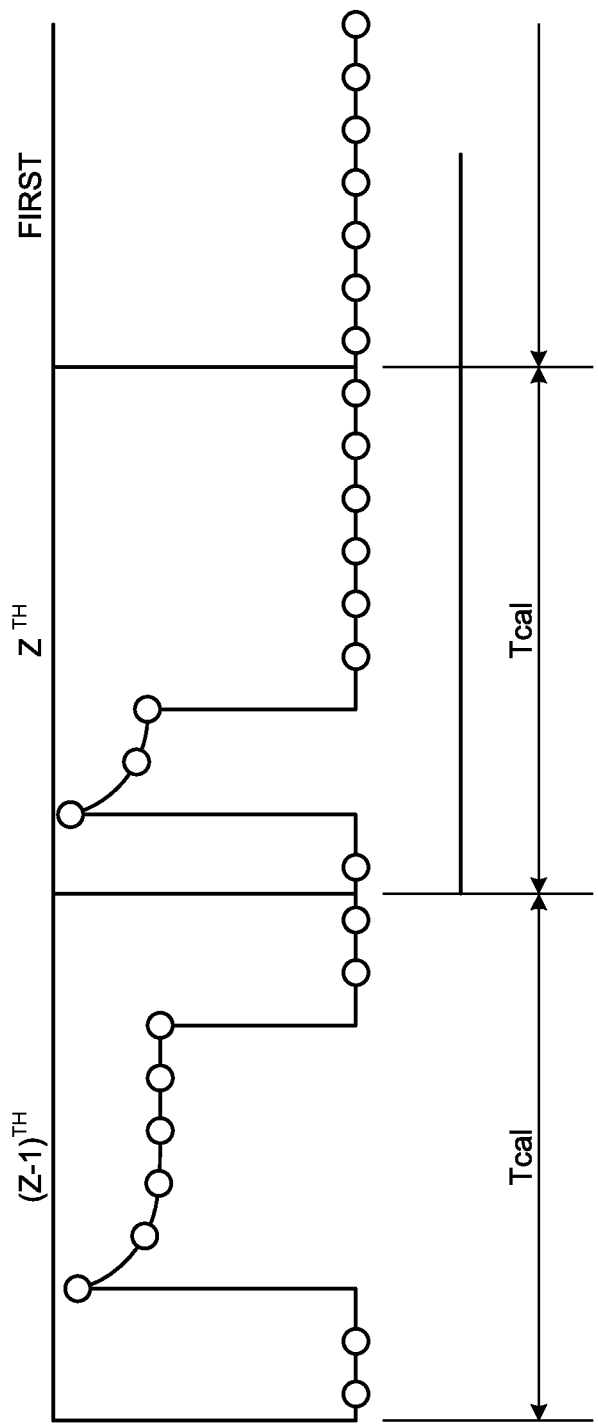
FIG. 4 is a chart for explaining a method for calculating a correction coefficient in the embodiment.
Figure 7:
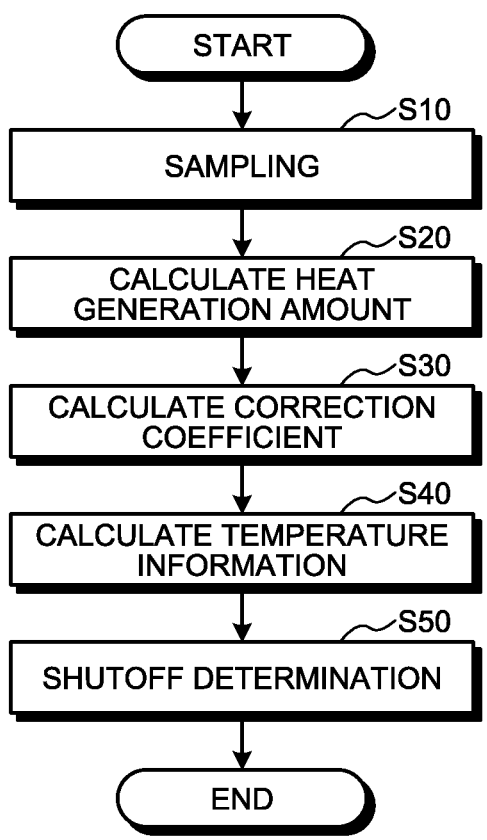
FIG. 7 is a flowchart illustrating operations of an electric wire protection device in the embodiment.

An embodiment will be described with reference to FIG. 1 to FIG. 7. The embodiment relates to an electric wire protection device and a control method for the electric wire protection device. FIG. 1 is a diagram illustrating the electric wire protection device in the embodiment, FIG. 2 is a chart illustrating a relation between a sampling cycle and a calculation cycle in the embodiment, FIG. 3 is a descriptive chart for explaining a method for calculating a heat quantity from a peak current, FIG. 4 is a chart for explaining a method for calculating a correction coefficient in the embodiment, FIG. 5 is a chart illustrating a relation between a total energization time and a total sampling time in the embodiment, FIG. 6 is a descriptive view for explaining shutoff determination in the embodiment, and FIG. 7 is a flowchart illustrating operations of an electric wire protection device in the embodiment.

As illustrated in FIG. 1, the electric wire protection device 1 in the embodiment includes a voltage adjusting unit 3 and a controller 2. The electric wire protection device 1 is mounted on a vehicle and supplies electric power to an electric load (hereinafter, simply referred to as "load") 12 of the vehicle. The load 12 to which the electric wire protection device 1 supplies the electric power is, for example, a lamp such as a headlamp of the vehicle. The electric wire protection device 1 controls a supply voltage to the load 12 by the voltage adjusting unit 3 and shuts off power supply to the load 12 by means of software. The electric wire protection device 1 estimates a heat generation amount and a heat dissipation amount of an electric wire on the basis of a value of an electric current flowing through the voltage adjusting unit 3 and shuts off power supply to the load 12 on the basis of estimation results thereof. Hereinafter, the electric wire protection device 1 in the embodiment will be described in detail.

The voltage adjusting unit 3 in the embodiment is a semiconductor relay having a signal input port 30, an input portion 31, an output portion 32, a signal output port 33, a current sensor circuit 34, and a semiconductor switching element 35. The signal input port 30 is electrically connected to a control signal output port 21 of the controller 2. The input portion 31 is electrically connected to a power source 11 of the vehicle. The power source 11 is, for example, a secondary battery such as a battery. The output portion 32 is electrically connected to the load 12.

The semiconductor switching element 35 is interposed between the input portion 31 and the output portion 32. The semiconductor switching element 35 executes or stops power supply to the load 12 in accordance with ON/OFF of a control signal. The semiconductor switching element 35 is, for example, a metal-oxide-semiconductor field-effect transistor (MOSFET). The voltage adjusting unit 3 performs duty control on the semiconductor switching element 35 by a control circuit (not illustrated). The duty control on the semiconductor switching element 35 is, for example, PWM control. The control circuit determines a duty ratio of the duty control on the basis of an input voltage from the power source 11 and a target voltage of a supply voltage to the load 12. The duty ratio is determined such that an effective voltage to the load 12 is the target value of the supply voltage.

The current sensor circuit 34 detects a value of a current flowing through the semiconductor switching element 35. In other words, the current sensor circuit 34 detects the value of the current flowing from the power source 11 to the load 12 through the voltage adjusting unit 3. A signal indicating a detection result by the current sensor circuit 34 is output from the signal output port 33. The signal output port 33 is electrically connected to a current signal input port 22 of the controller 2.

The controller 2 controls activation/stop of the voltage adjusting unit 3. The controller 2 is, for example, a control device or a control circuit such as a microcomputer. The controller 2 includes an operation unit, a storage unit, and a communication unit, and has a program and a circuit configuration for executing operations in the embodiment. The controller 2 includes an instruction signal input port 20, the control signal output port 21, the current signal input port 22, an input determination unit 23, a calculation unit 24, a shutoff determination unit 25, and a logic circuit 26.

The instruction signal input port 20 is a port to which an instruction signal activating the load 12 is input. The control signal output port 21 is a port from which the control signal to the voltage adjusting unit 3 is output. The current signal input port 22 is a port to which a signal for the current value detected by the current sensor circuit 34 is input.

A switch 4 mounted on the vehicle is electrically connected to the instruction signal input port 20. For example, a driver of the vehicle operates the switch 4. When an operation input for activating the load 12 is made on the switch 4, the switch 4 is switched into an activation instruction state from a stop instruction state. Switching of the switch 4 between the stop instruction state and the activation instruction state is, for example, switching between grounding and non-grounding. The switch 4 on which the operation input for the activation instruction has been made keeps the activation instruction state until an operation input for stopping the activation is made.

The input determination unit 23 is electrically connected to the instruction signal input port 20. The input determination unit 23 outputs a signal in accordance with a state of the switch 4. To be more specific, the input determination unit 23 outputs an ON signal when the switch 4 is in the activation instruction state and outputs an OFF signal when the switch 4 is in the stop instruction state.

The calculation unit 24 is a circuit or an operation device that calculates temperature information of an electric wire 5. The electric wire 5 as a temperature calculation target by the calculation unit 24 is, for example, the electric wire 5 connecting the power source 11 and the voltage adjusting unit 3 or the electric wire 5 connecting the voltage adjusting unit 3 and the load 12. The calculation unit 24 has a temperature computing unit 24a and a correction coefficient computing unit 24b. The temperature computing unit 24a acquires the signal indicating the current value detected by the current sensor circuit 34. The current sensor circuit 34 in the embodiment samples the current value every time a predetermined sampling cycle $\Delta t$ passes. That is to say, a sampling interval of the current value by the current sensor circuit 34 is the sampling cycle $\Delta t$.

In the embodiment, the temperature information that the calculation unit 24 calculates is an estimated value of the current temperature of the electric wire 5. In the following description, the current temperature of the electric wire 5 that the temperature computing unit 24a has calculated is simply referred to as an "estimated temperature Tw". The estimated temperature Tw is the current temperature of the electric wire 5 that the temperature computing unit 24a has estimated. The estimated temperature Tw of the electric wire 5 is calculated as, for example, a sum of an ambient temperature Tamb of the electric wire 5 and a temperature variation amount $\Delta T$. The ambient temperature Tamb may be, for example, a previously stored value or a measured value. For example, the temperature of the electric wire 5 in a steady state when the voltage adjusting unit 3 supplies a rated current to the load 12 is stored as the ambient temperature Tamb.

A basic concept of a method for calculating the temperature of the electric wire 5 will be described below with reference to an equation (1) to an equation (4). In the method, which will be described below, the temperature of the electric wire 5 is updated in accordance with the sampling cycle Δt of the current value. In the equation (1) to the equation (4), Pcin is heat generation energy [J/s] of the electric wire 5 per unit time, Pcout is heat dissipation energy [J/s] of the electric wire 5 per unit time, rc is a conductor resistance [Ω] of the electric wire 5, I is a current value [A] of an energizing current, Cth is a heat capacity [J/° C.] of the electric wire 5, Rth is a heat resistance [° C./W] of the electric wire 5, Qc(n) is a heat quantity (cumulative value) [J] of the electric wire 5 in $n^{th}$ sampling of the current value, Δt is the sampling cycle (sampling interval) [s], and ΔT is the temperature variation amount (cumulative value) [° C.] of the electric wire 5.

$$P\text{cin}=rc \times I^2 \tag{1}$$

$$P\text{cout}=Qc(n-1)/(C\text{th} \times R\text{th}) \tag{2}$$

$$Qc(n)=Qc(n-1)+(P\text{cin}-P\text{cout}) \times \Delta t \tag{3}$$

$$\Delta T=Qc(n)/C\text{th} \tag{4}$$

With reference to the above-mentioned equation (1) to the equation (4), the temperature information of the electric wire 5 is updated every time the current value I is sampled. With this calculation method, the processing load of the temperature computing unit 24a is more likely to be increased although the estimation accuracy of the temperature information can be improved.

As will be described below, the temperature computing unit 24a in the embodiment calculates the temperature information in a passed calculation cycle Tcal every time the predetermined calculation cycle Tcal passes. The calculation cycle Tcal is a cycle that is longer than the sampling cycle Δt of the current value I. The length of the calculation cycle Tcal in the embodiment is the length in which the current value I is sampled a plurality of number of times. As illustrated in FIG. 2, the calculation cycle Tcal in the embodiment is set to the length for ten sampling cycles Δt. In the embodiment, the number of times of sampling corresponding to the calculation cycle Tcal is referred to as a "predetermined sampling number Ns" in some cases. The calculation cycle Tcal is the product of the sampling cycle Δt and the predetermined sampling number Ns.

The temperature computing unit 24a constantly monitors sampling results of the current value I and detects a peak current Ipk. The peak current Ipk is a peak value of the current value I in the calculation cycle Tcal. The temperature computing unit 24a calculates a heat generation amount in one calculation cycle Tcal when the current value I is sampled ten times in the one calculation cycle Tcal. As illustrated in FIG. 3, the temperature computing unit 24a in the embodiment calculates the heat generation energy Pcin in the calculation cycle Tcal while supposing that energization with the peak current Ipk lasts from the beginning to the end of the calculation cycle Tcal. That is to say, the temperature computing unit 24a calculates the heat generation energy Pcin in the calculation cycle Tcal by the following equation (5).

$$P\text{cin}=rc \times Ipk^2 \tag{5}$$

The temperature computing unit 24a calculates the heat quantity (cumulative value) Qc(m) of the electric wire 5 in the mth calculation cycle Tcal by the following equation (6).

The temperature computing unit 24a calculates the heat dissipation energy Pcout of the electric wire 5 by the following equation (7).

$$Qc(m)=Qc(m-1)+(P\text{cin}-P\text{cout}) \times T\text{cal} \tag{6}$$

$$P\text{cout}=Qc(m-1)/(C\text{th} \times R\text{th}) \tag{7}$$

The correction coefficient computing unit 24b computes a correction coefficient α when the temperature computing unit 24a calculates the temperature information of the electric wire 5. The correction coefficient computing unit 24b calculates the correction coefficient α after the heat quantity Qc(m) is calculated a predetermined number of times (z times). The correction coefficient α is a ratio of a period of time during which energization has been detected in the calculation cycles Tcal for the predetermined number of times Z. The predetermined number of times Z is, for example, ten times. Calculation of the correction coefficient α will be described with reference to FIG. 4. In FIG. 4, energization is detected six times among the ten times of sampling in a (Z−1)th calculation cycle Tcal. Whether the energization has been made is determined depending on the magnitude of the sampled current value I. It is determined that the energization has been made when the magnitude of the sampled current value I is equal to or larger than a threshold Ith. The energization is detected three times in a predetermined Zth calculation cycle Tcal. The correction coefficient computing unit 24b computes the total sum Non (hereinafter, simply referred to as a "total detection number") of the number of times that the energization has been detected in a period from the first calculation cycle Tcal to the Zth calculation cycle Tcal.

A period of time (hereinafter, simply referred to as a "total energization time") during which the energization has been detected in the calculation cycles Tcal for the predetermined number of times Z is the product of the total detection number of times Non and the sampling cycle Δt. On the other hand, a total period of time (hereinafter, simply referred to as a "total sampling time") of the calculation cycles Tcal for the predetermined number of times Z is the product of the predetermined number of times Z and the calculation cycle Tcal. FIG. 5 illustrates a relation between the total energization time (Non×Δt) and the total sampling time (Z×Tcal). The correction coefficient α is calculated by the following equation (8). That is to say, the correction coefficient α is a ratio of the total energization time relative to the total sampling time.

$$\alpha=(\text{Non} \times \Delta t)/(Z \times T\text{cal}) \tag{8}$$

In the embodiment, the total period of time of the calculation cycles Tcal in which the heat quantity Qc(m) is a positive value is the total sampling time. In other words, when the calculation cycle Tcal during which the energization is not detected and the heat quantity Qc(m) is 0 is present, the calculation cycle Tcal in which the heat quantity Qc(m) is 0 is excluded from the total sampling time. Accordingly, the total sampling time is the product of the number of times Zon of the calculation cycles Tcal in which the heat quantity Qc(m) is positive and the calculation cycle Tcal. The correction coefficient α when the calculation cycle Tcal in which the heat quantity Qc(m) is 0 is present is calculated by the following equation (9).

$$\alpha=(\text{Non} \times \Delta t)/(\text{Zon} \times T\text{cal}) \tag{9}$$

The temperature computing unit 24a calculates a corrected heat quantity Qr [J] using the correction coefficient α by the following equation (10). The temperature computing unit 24a calculates the temperature variation amount ΔT of the electric wire 5 using the corrected heat quantity Qr [J] by the following equation (11). The temperature variation amount ΔT that is calculated by the following equation (11) is a temperature variation amount in a period to the Zth calculation cycle Tcal from the first calculation cycle Tcal.

$$Qr = \alpha \times Qc(Z) \quad (10)$$

$$\Delta T = Qr/Cth \quad (11)$$

In the embodiment, the corrected heat quantity Qr and the temperature variation amount ΔT are calculated while calculation of the heat quantities Qc(m) for the predetermined number of times Z is one cycle. In the following description, the calculation cycle of the temperature variation amount ΔT is referred to as a "temperature calculation cycle Ttem". That is to say, the temperature calculation cycle Ttem is a cycle expressed by the following equation (12). The temperature calculation cycle Ttem in the embodiment is identical to a correction coefficient calculation cycle in which the correction coefficient α is calculated.

$$Ttem = Z \times Tcal \quad (12)$$

When one temperature calculation cycle Ttem is ended, the temperature computing unit 24a executes calculation of the temperature variation amount ΔT while shifting to a subsequent temperature calculation cycle Ttem. That is to say, the temperature computing unit 24a resets the number of times m of the heat quantity Qc(m) and starts calculation of the first heat quantity Qc(1) when shifting to the new temperature calculation cycle Ttem. In this case, in the above-mentioned equation (6) and equation (7), the corrected heat quantity Qr calculated in the previous temperature calculation cycle Ttem is used as a previous value Qc(0) of the heat quantity Qc(m).

The shutoff determination unit 25 makes shutoff determination on the basis of the signal of the input determination unit 23 and the estimated temperature Tw (temperature information) acquired from the temperature computing unit 24a. The shutoff determination unit 25 outputs a signal indicating a determination result to the logic circuit 26.

The shutoff determination unit 25 in the embodiment makes the shutoff determination as illustrated in FIG. 6, for example. FIG. 6 illustrates the signal (SW) of the input determination unit 23, the estimated temperature Tw, and the content of the shutoff determination that is made by the shutoff determination unit 25. The shutoff determination unit 25 outputs an ON signal when the input determination unit 23 outputs an ON signal and the estimated temperature Tw is equal to or higher than a predetermined shutoff temperature Tsh (HI). The ON signal is a shutoff instruction to make the voltage adjusting unit 3 into a shutoff state. The shutoff state is a state in which power supply to the load 12 in the voltage adjusting unit 3 is continuously stopped and the duty control is not performed. On the other hand, the shutoff determination unit 25 outputs an OFF signal when the input determination unit 23 outputs the ON signal and the estimated temperature Tw is lower than the predetermined shutoff temperature Tsh (LOW). The OFF signal is a normal instruction to permit power supply to the load 12 by the voltage adjusting unit 3.

The shutoff determination unit 25 maintains the content of the shutoff determination until the signal of the input determination unit 23 is reset. In other words, after the shutoff determination unit 25 determines that the voltage adjusting unit 3 is made into the shutoff state, the signal of the input determination unit 23 is once set to OFF and the shutoff determination unit 25 keeps outputting the ON signal until the signal of the input determination unit 23 is set to ON again. When the signal of the input determination unit 23 is switched to OFF from ON in a state in which the shutoff determination unit 25 outputs the OFF signal, the shutoff determination unit 25 keeps outputting the OFF signal until the signal of the input determination unit 23 is set to ON again.

The logic circuit 26 outputs a control signal in accordance with the signal of the input determination unit 23 and the signal of the shutoff determination unit 25. ON/OFF of the output signal of the shutoff determination unit 25 is inverted and the inverted output signal is input to the logic circuit 26. That is to say, the ON signal of the shutoff determination unit 25 is inverted to the OFF signal and the OFF signal is input to the logic circuit 26, and the OFF signal of the shutoff determination unit 25 is inverted to the ON signal and the ON signal is input to the logic circuit 26. The logic circuit 26 is an AND circuit. When the output signal of the input determination unit 23 is ON and the shutoff determination unit 25 outputs the OFF signal, the logic circuit 26 outputs an ON signal from the control signal output port 21. The ON signal that the logic circuit 26 outputs is a supply instruction signal instructing to execute power supply to the load 12.

On the other hand, when the output signal of the input determination unit 23 is OFF or when the shutoff determination unit 25 outputs the ON signal, the logic circuit 26 outputs an OFF signal from the control signal output port 21. The OFF signal that the logic circuit 26 outputs is a stop instruction signal instructing to stop power supply to the load 12. The stop instruction signal that the logic circuit 26 outputs when the shutoff determination unit 25 outputs the ON signal functions as the shutoff instruction signal for making the voltage adjusting unit 3 into the shutoff state to protect the electric wire 5. The voltage adjusting unit 3 continuously shuts off the power source 11 and the load 12 in accordance with the stop instruction signal, so that energization to the electric wire 5 is stopped and heat generation in the electric wire 5 is stopped. As a result, further increase in the temperature of the electric wire 5 is prevented.

FIG. 7 illustrates operations of the electric wire protection device 1. In other words, FIG. 7 illustrates a control method for the electric wire protection device in the embodiment. A flowchart in FIG. 7 is repeatedly executed. At step S10, the current value I is sampled. The current sensor circuit 34 of the voltage adjusting unit 3 samples the current value I flowing through the semiconductor switching element 35 at the sampling cycle Δt. The sampled current value I is output to the calculation unit 24 every time the current value I is sampled. After step S10 is executed, the process advances to step S20.

The heat generation amount is calculated at step S20. The temperature computing unit 24a calculates the heat quantity Qc(m) in the calculation cycle Tcal when it has acquired the current values I for the predetermined sampling number Ns in the calculation cycle Tcal as the calculation target. The calculation of the heat quantity Qc(m) is not executed when the temperature computing unit 24a has not acquired the current values I for the predetermined sampling number Ns at the time of the advancement to step S20. After step S20 is executed, the process advances to step S30.

The correction coefficient α is calculated at step S30. The correction coefficient computing unit 24b calculates the correction coefficient α when the heat quantities Qc(m) for the predetermined number of times Z in the temperature calculation cycle Ttem as the calculation target have been calculated. The calculation of the correction coefficient α is not executed when the calculation of the heat quantities Qc(m) for the predetermined number of times Z has not been finished. After step S30 is executed, the process advances to step S40.

The temperature information is calculated at step S40. The temperature computing unit 24a calculates the temperature variation amount ΔT of the electric wire 5 on the basis of the total value of the heat quantities Qc(m) for the predetermined number of times Z that have been calculated at step S20 and the correction coefficient α calculated at step S30. The temperature computing unit 24a computes the estimated temperature Tw from the calculated temperature variation amount ΔT. The calculation of the temperature information is not executed at step S40 when the heat quantities Qc(m) for the predetermined number of times Z have not been calculated or when the correction coefficient α has not been calculated. After step S40 is executed, the process advances to step S50.

The shutoff determination is made at step S50. The shutoff determination unit 25 makes the shutoff determination on the basis of the output signal of the input determination unit 23 and the estimated temperature Tw calculated at step S40. When the determination that the voltage adjusting unit 3 is made to shift into the shutoff state in the shutoff determination at step S50, the control signal of the logic circuit 26 is set to OFF. As a result, the voltage adjusting unit 3 makes the semiconductor switching element 35 into the shutoff state to shut off the power source 11 and the load 12. After step S50 is executed, this control flow is ended.

As described above, the electric wire protection device 1 in the embodiment includes the voltage adjusting unit 3 and the controller 2 including the calculation unit 24. The voltage adjusting unit 3 adjusts the voltage of the power source 11 and supplies the resulting voltage to the load 12. The calculation unit 24 computes the temperature information of the electric wire 5 connecting the power source 11 and the load 12 using the current value I flowing through the voltage adjusting unit 3. The controller 2 makes the voltage adjusting unit 3 into the shutoff state on the basis of the temperature information calculated by the calculation unit 24.

In the embodiment, the current value I is sampled a plurality of number of times in the predetermined calculation cycle Tcal. The calculation unit 24 calculates the heat quantity Qc(m) of the electric wire 5 in the calculation cycle Tcal and the correction coefficient α from the sampling results for the number of times. The heat quantity Qc(m) is calculated from the peak current Ipk as one current value that is determined from the sampling results for the number of times and the calculation cycle Tcal. In the embodiment, the heat quantity Qc(m) is calculated while the peak current Ipk is considered to be continuously fed in the calculation cycle Tcal.

The correction coefficient α is the ratio of the period of time during which the energization has been detected in the calculation cycle Tcal. The calculation unit 24 calculates the temperature information by multiplying the heat quantity Qc(m) by the correction coefficient α. The temperature information is calculated from the corrected heat quantity Qr calculated by multiplying the heat quantity Qc(m) by the correction coefficient α. In this manner, the electric wire protection device 1 in the embodiment calculates the heat quantity Qc(m) in the calculation cycle Tcal from one current value (peak current Ipk) that is determined from the sampling results for the number of times. The load of the temperature computing unit 24a related to the calculation of the temperature information is reduced. Furthermore, the electric wire protection device 1 in the embodiment corrects the heat quantity Qc(m) with the correction coefficient α calculated from the total detection number of times Non.

The correction coefficient α in the embodiment can cause the heat quantity Qc(m) to have a similar resolution to that of the sampling cycle Δt of the current value I. The electric wire protection device 1 in the embodiment can therefore ensure the accuracy of the temperature estimation while reducing the load of the temperature computing unit 24a and preventing operation errors of the temperature information.

In the electric wire protection device 1 in the embodiment, the calculation unit 24 updates the temperature information every time the calculation cycles Tcal for the predetermined number of times Z pass. The correction coefficient α is the ratio of the total period of time of the sampling cycles Δt during which the energization has been detected relative to the total period of time of the calculation cycles Tcal for the predetermined number of times Z. The calculation unit 24 calculates the corrected heat quantity Qr by multiplying the sum of the heat quantities Qc(m) for the predetermined number of times Z by the correction coefficient α. In this manner, the operation load of the calculation unit 24 is further reduced by setting the calculation cycle of the correction coefficient α to be longer than the calculation cycle of the heat quantity Qc(m).

The control method for the electric wire protection device in the embodiment includes a sampling step of sampling the current value I, a heat quantity calculation step of calculating the heat generation amount of the electric wire 5, a correction coefficient calculation step of calculating the correction coefficient α, a temperature calculation step of calculating the temperature information, and a shutoff determination step.

The sampling step is a step of sampling the current value I that is fed to the voltage adjusting unit 3. The heat quantity calculation step is a step of calculating the heat quantity Qc(m) of the electric wire 5 in the calculation cycle Tcal on the basis of one current value that is determined from the sampling results for the number of times. The correction coefficient calculation step is a step of calculating the correction coefficient α as the ratio of the period of time during which the energization has been detected in the calculation cycle Tcal. The temperature calculation step is a step of calculating the temperature information of the electric wire 5 by multiplying the heat quantity Qc(m) by the correction coefficient α. The temperature information is computed from, for example, the corrected heat quantity Qr calculated by multiplying the heat quantity Qc(m) by the correction coefficient α. The shutoff determination step is a step of determining whether the voltage adjusting unit 3 is made into the shutoff state on the basis of the temperature information.

The control method for the electric wire protection device 1 in the embodiment can reduce the load related to the computation of the temperature information and prevent operation errors of the temperature information.

Modifications of Embodiment

Modifications of the embodiment will be described. The predetermined sampling number Ns is not limited to ten times. The predetermined sampling number Ns is appropriately set in accordance with a control cycle of the duty control on the semiconductor switching element 35, or the like.

The predetermined number of times Z is not limited to ten times. Furthermore, the predetermined number of times Z is not limited to the number of times and may be one time. The temperature computing unit 24a may compute the temperature variation amount ΔT without computing the corrected heat quantity Qr.

In the electric wire protection device 1, a unit that adjusts the voltage of the power source 11 and supplies it to the load is not limited to the semiconductor switching element. The semiconductor switching element 35 is not limited to the MOSFET. Another switching element may be used as the semiconductor switching element 35. The load 12 is not limited to the lamp. The load 12 may be an electric load other than the lamp.

The temperature information that the temperature computing unit 24a computes is not limited to the estimated temperature Tw of the electric wire 5. The temperature information is information about the temperature of the electric wire 5 or information about a physical quantity related to the temperature of the electric wire 5. The temperature information that the controller 2 refers in the shutoff determination may be, for example, the temperature variation amount ΔT or the heat quantity Qc.

The components disclosed in the above-mentioned embodiment and modifications can be appropriately combined for execution.

The electric wire protection device according to the present embodiments includes the voltage adjusting unit that adjusts the voltage of the power source side and supplies it to the load, and the controller that includes the calculation unit configured to compute the temperature information of the electric wire connecting the power source and the load from a value of the current flowing through the voltage adjusting unit and makes the voltage adjusting unit into the shutoff state of shutting off the power source and the load on the basis of the temperature information. The current value is sampled a plurality of number of times in the predetermined calculation cycle. The calculation unit calculates the heat generation amounts of the electric wire in the calculation cycles and the correction coefficient from the sampling results for the number of times.

The heat generation amount is calculated from one current value that is determined from the sampling results for a plurality of number of times and the calculation cycle. The correction coefficient is the ratio of the period of time during which energization has been detected in the calculation cycles. The calculation unit calculates the temperature information by multiplying the heat generation amount by the correction coefficient. With the electric wire protection device in the present embodiments, the operation load can be reduced by calculating the heat generation amount from the sampling results for the number of times. The electric wire protection device in the present embodiments provides an effect that accuracy in the temperature estimation of the electric wire can be ensured by correcting the heat generation amount using the ratio of the period of time during which the energization has been detected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire protection device comprising:
    a voltage adjusting unit that adjusts voltage of a power source side and supplies the resulting voltage to a load; and
    a controller that includes a calculation unit configured to compute temperature information of an electric wire connecting a power source and the load from a value of an electric current flowing through the voltage adjusting unit, and that is configured to make the voltage adjusting unit into a shutoff state of shutting off the power source and the load on the basis of the temperature information, wherein
    the current value is sampled a plurality of number of times in a predetermined calculation cycle,
    the calculation unit calculates a heat generation amount of the electric wire in the calculation cycle and a correction coefficient from results of the sampling for the number of times,
    the heat generation amount is calculated from one current value that is determined from the sampling results for the number of times and the calculation cycle,
    the correction coefficient is a ratio of a period of time during which energization has been detected in the calculation cycle, and
    the calculation unit calculates the temperature information by multiplying the heat generation amount by the correction coefficient.

2. The electric wire protection device according to claim 1, wherein
    the calculation unit updates the temperature information every time the calculation cycles for the predetermined number of times pass, and
    the correction coefficient is a ratio of a total period of time of sampling cycles during which the energization has been detected relative to a total period of time of the calculation cycles for the predetermined number of times, and
    the calculation unit calculates the temperature information by multiplying a total sum of the heat generation amounts for the predetermined number of times by the correction coefficient.

3. A control method for an electric wire protection device, the control method comprising:
    a step of sampling a current value of a voltage adjusting unit that adjusts voltage of a power source side and supplies the resulting voltage to a load;
    a step of calculating a heat generation amount of an electric wire in a calculation cycle on the basis of one current value that is determined from results of the sampling for a plurality of number of times;
    a step of calculating a correction coefficient as a ratio of a period of time during which energization has been detected in the calculation cycle;
    a step of calculating temperature information of the electric wire by multiplying the heat generation amount by the correction coefficient; and
    a step of determining whether the voltage adjusting unit is made into a shutoff state on the basis of the temperature information.

* * * * *